US008942230B2

(12) United States Patent
ElGendy et al.

(10) Patent No.: US 8,942,230 B2
(45) Date of Patent: Jan. 27, 2015

(54) LOGICAL PACKET SWITCHING DEVICE WITH SWITCHING FABRIC EXTENDED BETWEEN MULTIPLE PHYSICAL DEVICES

(75) Inventors: Mohamed ElGendy, San Ramon, CA (US); Gopakumar Choorakkot Edakkunni, San Jose, CA (US); Micah Raphael Nishimura-Simmons, Cloverdale, CA (US); Kaushik K. Dam, Santa Clara, CA (US); Shyamsundar N. Maniyar, San Jose, CA (US); Larry Tzuchu Chang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 109 days.

(21) Appl. No.: 13/217,964

(22) Filed: Aug. 25, 2011

(65) Prior Publication Data

US 2013/0051384 A1 Feb. 28, 2013

(51) Int. Cl.
*H04L 12/64* (2006.01)
*H04L 12/931* (2013.01)
*H04L 12/933* (2013.01)
*H04L 12/775* (2013.01)

(52) U.S. Cl.
CPC .............. *H04L 49/45* (2013.01); *H04L 49/15* (2013.01); *H04L 45/58* (2013.01)
USPC ....................................... 370/355

(58) Field of Classification Search
None
See application file for complete search history.

(56) References Cited

U.S. PATENT DOCUMENTS

| 5,742,604 | A  | * | 4/1998  | Edsall et al. ............. 370/401 |
| 6,990,103 | B1 |   | 1/2006  | Gollamudi |
| 7,068,661 | B1 |   | 6/2006  | Watt et al. |
| 7,110,394 | B1 | * | 9/2006  | Chamdani et al. ........ 370/355 |
| 7,307,995 | B1 |   | 12/2007 | Iyer et al. |

(Continued)

FOREIGN PATENT DOCUMENTS

EP        1802051 A2    6/2007

OTHER PUBLICATIONS

PCT International Search Report and the Written Opinion of the International Searching Authority for PCT Application PCT/US2012/051768 (which claims priority to U.S. Appl. No. 13/217,964), ISA/US, mailed Nov. 19, 2012 (twelve pages).

(Continued)

*Primary Examiner* — Chirag Shah
*Assistant Examiner* — Rina Pancholi
(74) *Attorney, Agent, or Firm* — The Law Office of Kirk D. Williams

(57) ABSTRACT

In one embodiment, a logical packet switching device has its switching fabric extended between multiple physical devices, such as, but not limited to, over one or more networks (e.g., over tunnel(s), point-to-point link(s), and/or public and/or private L2 or L3 network(s)). In particular, one embodiment extends the switching fabric between multiple different physical devices by effectively merging, at least from the perspective of ingress and/or egress line cards, a switching fabric in each of these multiple different physical devices. In this regard, an ingress lookup operation in a first physical device of one embodiment produces information which is used by the switching fabric in a different physical device to forward a packet to the appropriate egress line card in the different physical device. Further, one embodiment includes line cards which can be used to both extend the switching fabric as well as communicate with packet switching and other devices that are independent of the logical packet switching device.

25 Claims, 6 Drawing Sheets

(56) References Cited

U.S. PATENT DOCUMENTS

| | | |
|---|---|---|
| 7,406,038 B1 | 7/2008 | Oelke et al. |
| 2007/0147364 A1* | 6/2007 | Palacharla et al. ............ 370/389 |

OTHER PUBLICATIONS

Fu et al., "Towards Distributed Router Architectures and Centralized Control Architectures in IP Networks," Royal Institute of Technology, Stockholm, Sweden, 2008 (six pages).

* cited by examiner

LOGICAL PACKET SWITCHING DEVICE WITH SWITCHING FABRIC EXTENDED BETWEEN MULTIPLE PHYSICAL DEVICES

TECHNICAL FIELD

The present disclosure relates generally to extending the switching fabric of a packet switching device across a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Accordingly, the ability to provide communications mechanisms and methodologies that allow greater bandwidth, achieve superior performance, and/or offer minimal delay presents a significant challenge for designers of packet switching devices and network managers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
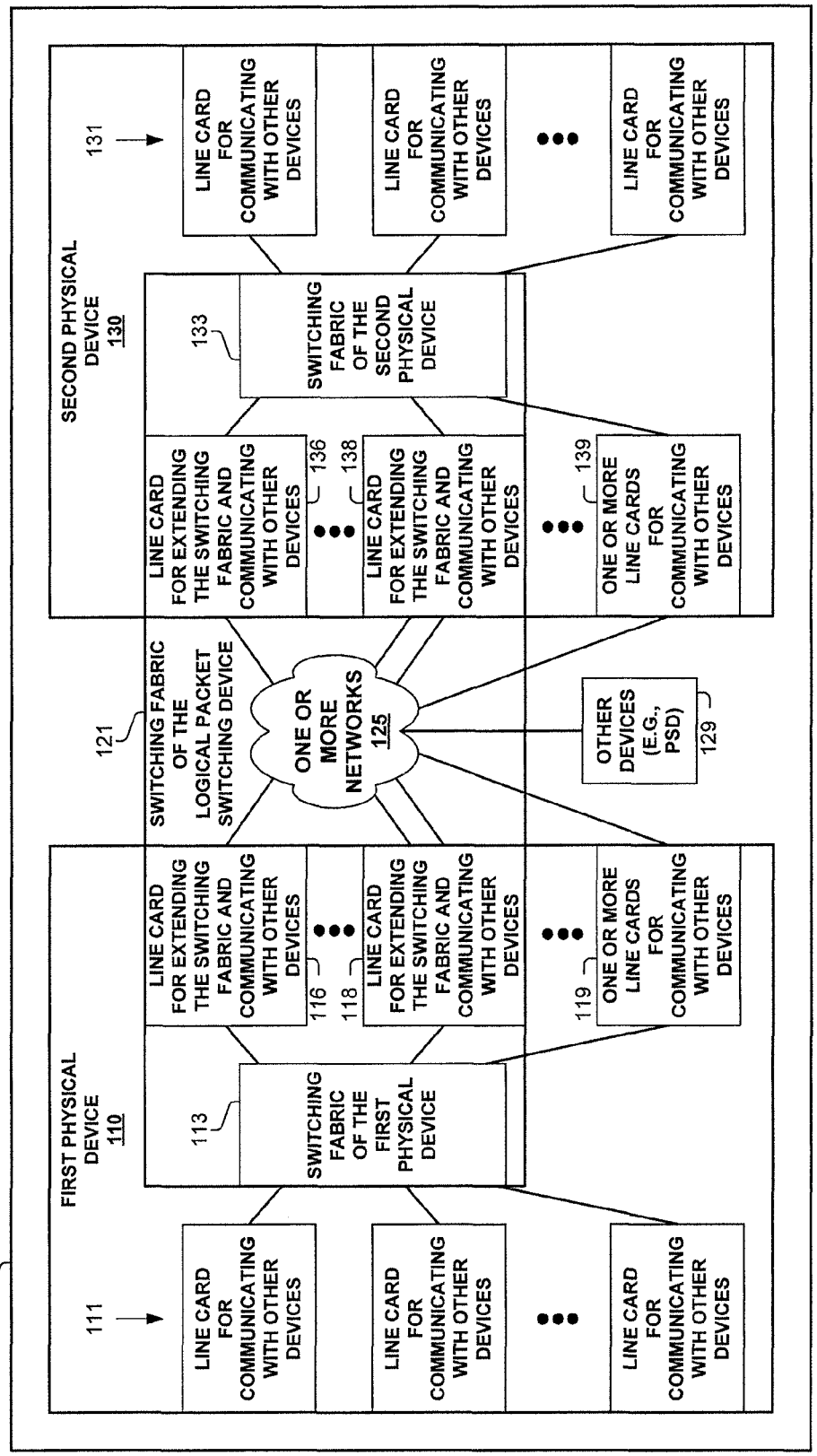
FIG. 1 illustrates a logical packet switching device configured to operate, and/or operating, according to one embodiment.

Disclosed are, inter alia, methods, apparatus, computer-storage media, mechanisms, and means associated with a logical packet switching device having its switching fabric extended between multiple physical devices.

One embodiment of a logical packet switching device comprises: a first physical device including a plurality of first ports, a first switching fabric, and a plurality of first egress line cards; and a second physical device including a plurality of second ports, a second switching fabric, and a plurality of second egress line cards. The first and second physical devices are each configured to extend the switching fabric of the logical packet switching device between the first and second physical devices over one or more standard-protocol networks coupled to one or more of the plurality of first ports and to one or more of the plurality of second ports. This extending of the switching fabric of the logical packet switching device includes: the first physical device sending packets including second fabric information for use by the second switching fabric in switching corresponding packets to one or more egress line cards of the plurality of second egress line cards, and the second physical device sending packets including first fabric information for use by the first switching fabric in switching corresponding packets to one or more egress line cards of the plurality of first egress line cards.

One embodiment of a logical packet switching device comprises: a first physical device including a first dual purpose line card, comprising a plurality of first ports; and a second physical device including a first dual purpose line card, comprising a plurality of second ports. Each of the plurality of first ports and the plurality of second ports are configurable to perform each function of: a first function of extending the switching fabric of the logical packet switching device between physical devices, and a second function of communicating packets with one or more other devices that are independent of the logical packet switching device; and wherein at least one port of the plurality of first ports and at least one port of the plurality of second ports are each configured to extend the switching fabric of the logical packet switching device between the first and second physical devices; and wherein at least one port of the plurality of first ports is configured to communicate packets with one or more other packet switching devices that are independent of the logical packet switching device; and wherein at least one port of the plurality of second ports is configured to communicate packets with one or more other packet switching devices that are independent of the logical packet switching device.

2. Description

Disclosed are, inter alia, methods, apparatus, computer-storage media, mechanisms, and means associated with a logical packet switching device having its switching fabric extended between multiple physical devices.

Note, as used herein, the term "logical packet switching device" refers to a single, coherent packet switching device with a common control plane that has its hardware distributed among multiple different physical devices (e.g., racks) that are communicatively coupled to perform the switching functionality. In particular, one embodiment extends the switching fabric between multiple different physical devices by effectively merging, at least from the perspective of ingress and/or egress line cards, a switching fabric in each of these multiple different physical devices.

Further, as used herein, the term "ingress" refers to the arrival direction in which packets are processed; while the term "egress" refers to the departure direction in which packets are processed. For example, an ingress line card/port typically refers to the line card/port on which a packet is received by a packet switching device, and an egress line card/port typically refers to the line card/port from which a packet will exit a packet switching device (e.g., exit the logical packet switching device in one embodiment). Line cards are typically configured to perform the ingress and egress capabilities.

Further note, as used herein, the term "standard-protocol networks" refers to a network that at least the layer 2 and/or layer 3 of which conforms to an industry standard, although it may use custom extensions as provided for in the industry standard. Examples of such networks include, but are not limited to, an Internet Protocol (IP) network, an IEEE-defined protocol network (e.g., 802.11, 802.3, Ethernet), a Multiprotocol Label Switching (MPLS) network, an Asynchronous Transfer Mode (ATM) network, and a Synchronous Optical Network (SONET). In contrast, an example of a non-standard-protocol network would be a proprietary implementation of communication over a communication link.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates logical packet switching device 100 configured to operate, and/or operating according to one embodiment. As shown, logical packet switching device 100 includes a first physical device 110 and a second physical device 130, which may be colocated or geographically distributed, such as, but not limited to, being located in different building, different cities, etc.

First physical device 110 includes line cards 111 and 119 for communicating with other devices (e.g., packet switching device, hosts, independent of, e.g., not integral to, logical packet switching device 100), switching fabric 113, and line cards 116-118 configured to extend the switching fabric between multiple physical devices 110 and 130 of logical packet switching device 100. Note, the switching fabric of a logical packet switching device may be extended among two, or more than two, logical packet switching devices as taught herein to one skilled in the art. Further note, in one embodiment, one of more of line cards 111 may have the same capability as line card 116 (e.g., also could be used to extend the switching fabric), but is not denoted as such because they are not configured as such in the one embodiment illustrated in FIG. 1.

Second physical device 130 includes line cards 131 and 139 for communicating with other devices (e.g., packet switching device, hosts, independent of, e.g., not integral to, logical packet switching device 100), switching fabric 133, and line cards 136-138 configured to extend the switching fabric between multiple physical device 110 and 130 of logical packet switching device 100. Note, the switching fabric of a logical packet switching device may be extended among two, or more than two, logical packet switching devices as taught herein to one skilled in the art. Further note, in one embodiment, one of more of line cards 131 may have the same capability as line card 136 (e.g., also could be used to extend the switching fabric), but is not denoted as such because they are not configured as such in the one embodiment illustrated in FIG. 1.

As illustrated in relation to other devices 129 (e.g., packet switching device(s), host(s)), one or more of line cards 116-118 and 136 may be used to communicate with other devices 129, in addition to extending the switching fabric (121) of logical packet switching device 100 between multiple physical devices 110 and 130 over one or more networks 125 (e.g., standard-protocol networks). Also, line cards 119 and 139 may be used to communicate with other devices 129 via one or more networks 125.

As shown, the switching fabric of logical packet switching device 100 is extended (121) between multiple physical devices 110 and 130 over one or more networks 125 (e.g., standard-protocol networks). One embodiment accomplishes this by including in an ingress lookup result information of first physical device 110: information which can be used by switching fabric 133 of second physical device 130 to forward packets to an appropriate egress line card 131, 136-139 of second physical device 130. For the other direction of packet traffic between multiple physical devices 110 and 130, one embodiment accomplishes this by including in an ingress lookup result information of second physical device 130:

information which can be used by switching fabric 113 of first physical device 110 to forward packets to an appropriate egress line card 111, 116-119 of first physical device 110. Internally, each physical device 110 and 130 typically will forward packets, that are to be sent from the other device 130 and 110, to one of their line cards 116-118 or 136-138 for communicating over one or more networks 125 to the other physical device 130 or 110. In one embodiment, the forwarding of packets between switching fabric 113 of first physical device 110 and switching fabric 133 of second physical device 130 is effectively hidden such that the receiving switching fabric 113 or 133 forwards a received packet as if the packet was natively received on the corresponding physical packet switching device 110 or 130.

Figure 2A:
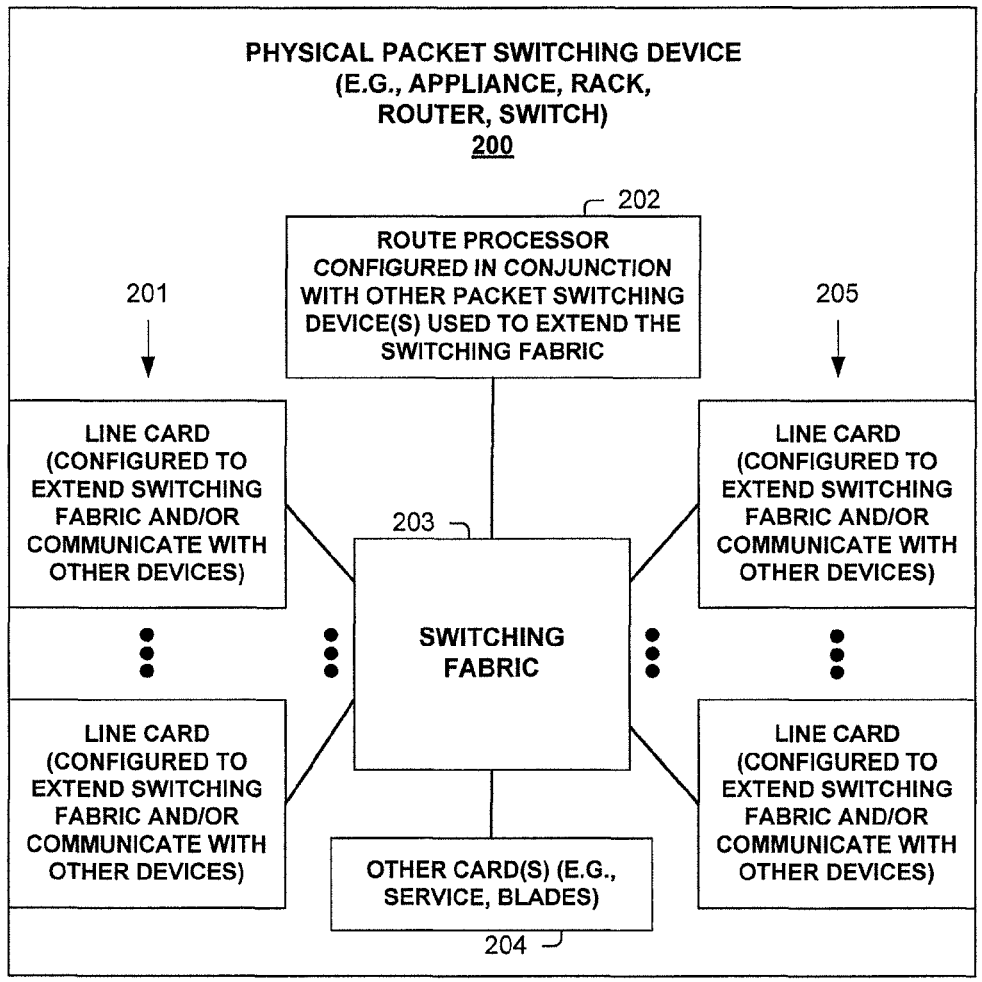
FIG. 2A illustrates a logical packet switching device configured to operate, and/or operating, according to one embodiment.

FIG. 2A illustrates a packet switching device 200 (e.g., appliance, rack, router, switch) used in one embodiment. As shown, packet switching device 200 includes line cards 201 and 205, each of which is configured to: extend the switching fabric between multiple physical devices that are part of a logical packet switching device, and/or communicate with other devices (e.g., packet switching devices, hosts). As shown, packet switching device 200 also includes a switching fabric communicatively coupling line cards 201 and 205, other cards 204 (e.g., service cards, blades), and a route processor 202 configured in conjunction with other packet switching devices(s) used to extend the switching fabric of a logical packet switching device. As known to one skilled in the art, route processor 202 is part of the control plane of packet switching device 200.

Figure 2B:
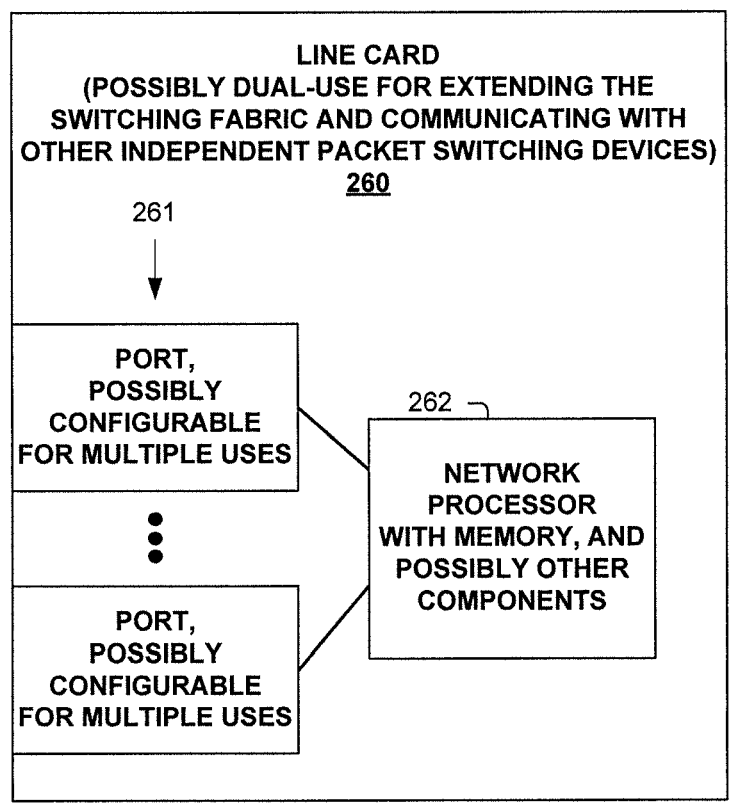
FIG. 2B illustrates a line card configured to operate, and/or operating, according to one embodiment.

FIG. 2B illustrates a line card 260 used in one embodiment. As shown, line card 260 includes multiple ports 261 which may be configured for one or more purposes (e.g., extending the switching fabric among multiple physical devices in a logical packet switching device, communicating with other packet switching devices and/or hosts external to the logical or physical packet switching device including line card 260). Also shown in FIG. 2B is network processor 262 (with memory and possibly other components) that process packets for line cards 261. Thus, one embodiment uses a same packet processor 262 for processing packets that are sent over the extended switching fabric of a logical packet switching device, as well as packets sent to an external device or host.

Figure 3:
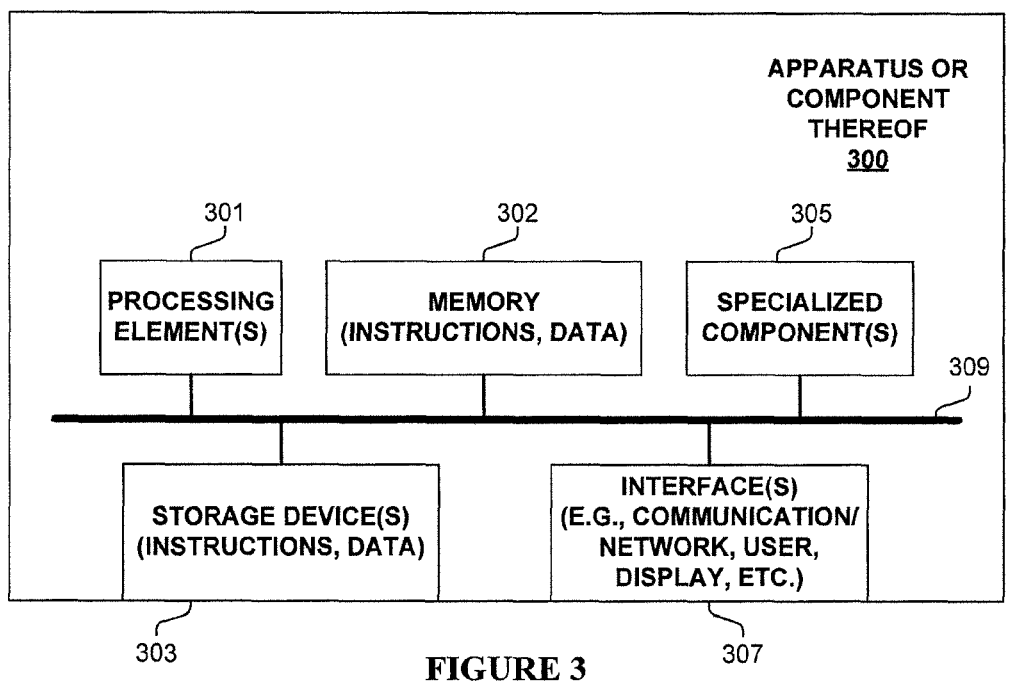
FIG. 3 illustrates an apparatus or component configured to operate, and/or operating, according to one embodiment.

FIG. 3 is a block diagram of an apparatus or component 300 used in one embodiment associated with a logical packet switching device having its switching fabric extended between multiple physical devices. In one embodiment, apparatus or component 300 performs one or more processes corresponding to one of the flow diagrams illustrated or otherwise described herein, and/or illustrated in another diagram or otherwise described herein.

In one embodiment, apparatus or component 300 includes one or more processing element(s) 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of a particular application. In one embodiment, apparatus or component 300 corresponds to, or is part of, logical packet switching device 100 of FIG. 1, packet switching device 200 of FIG. 2A, and/or line card 260 of FIG. 3B.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4:
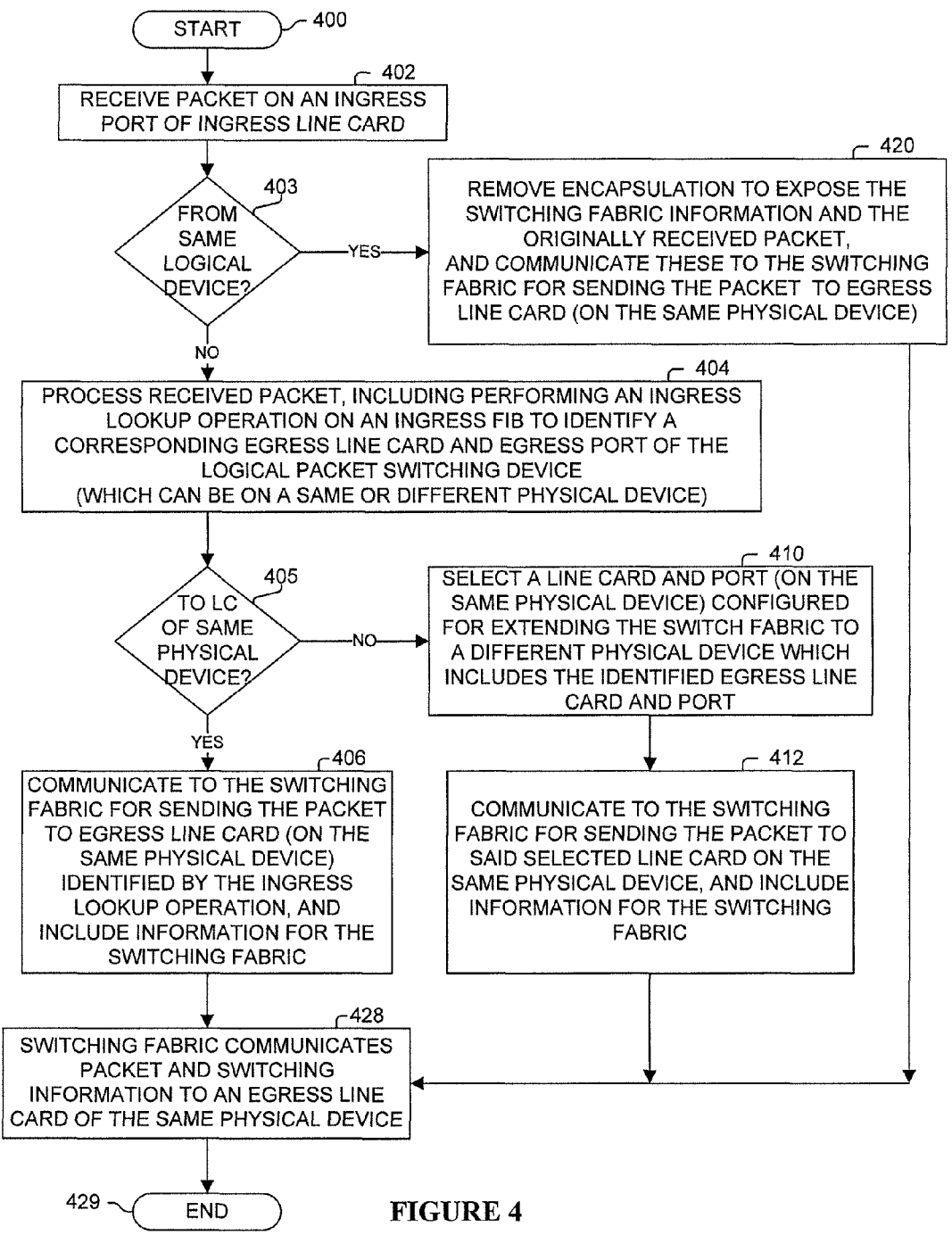
FIG. 4 illustrates a process configured to be performed, and/or performed, in one embodiment.

FIG. 4 illustrates a process performed in one embodiment of a logical packet switching device. Processing begins with process block 400. In process block 402, a packet is received on an ingress port of an ingress line card.

As determined in process block 403, if the packet is not received from the same logical packet switching device (e.g., over an extended switching fabric of the logical packet switching device), then in process block 404, the received packet is processed, which includes performing an ingress lookup operation on an ingress forwarding information base (FIB) to identify a corresponding egress line card and egress port of the logical packet switching device, which can be on the same or a different physical device of the logical packet switching device.

As determined in process block 405, if the packet is to be sent to a line card on the same physical device, then in process block 406, the received packet and information for use by the switching fabric are communicated to the switching fabric for sending the received packet to the egress line card (on the same physical device) identified by the ingress lookup operation.

Otherwise, as determined in process block 405, the received packet and switching information is to be communicated over the extended switching fabric to an egress line card on a different physical device of the logical packet switching device. In process block 410, selected is a line card and port on the same physical device that is being used to extend the switching fabric to a different device including the destination egress line card (and egress port) of the logical packet switching device. One embodiment uses a load balancing and/or other data routing technique (e.g., based on traffic type, priority, etc.) in selecting and/or distributing packets among line cards and/or ports (and effectively which network links) for communicating to the different physical device of the logical packet switching device. In process block 412, the packet and switching information is communicated to the switching fabric of the same physical device for communicating this information to the egress line card for forwarding over the extended switching fabric to a different physical device of the logical packet switching device.

Otherwise, as determined in process block 403, the packet was received from a different physical device of the logical packet switching device. Then, in process block 420, the encapsulation of the received packet is removed to reveal the originally received packet and the switching fabric information (identified by a previous ingress lookup operation), and these are communicated to the switching fabric for sending to the egress line card on the same physical device.

In process block 428, the received packet and switching information is communicated to an egress line card on the same physical device. Processing of the flow diagram of FIG. 4 is complete as indicated by process block 429.

Figure 5:
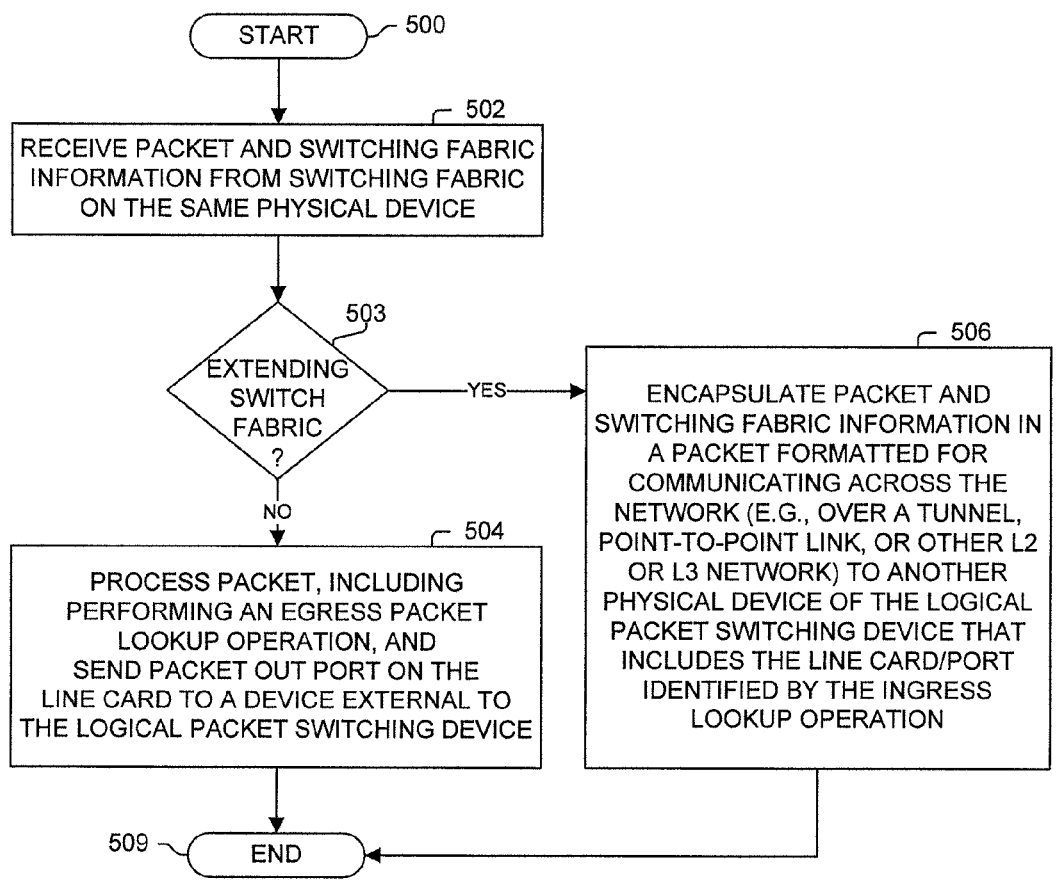
FIG. 5 illustrates a process configured to be performed, and/or performed, in one embodiment.

FIG. 5 illustrates a process performed in one embodiment, which begins with process block 500. In process block 502, a packet and switching fabric information are received on an egress line card from the switching fabric on the same physical device. As determined in process block 503, if the packet is not to be sent over the extended switching fabric of the logical packet switching device, then in process block 504, the packet is processed, typically including an egress lookup operation, with the packet being sent out the corresponding port of the egress line card to a device (e.g., packet switching device, host) external to the logical packet switching device. Otherwise, in process block 506, the packet and switching fabric information is encapsulated in another packet formatted for communication across one or more networks (e.g., over tunnel(s), point-to-point link(s), and/or public and/or private L2 or L3 network(s)) to another physical packet switching device of the logical packet switching devices that includes the line card and/or port identified by the original ingress lookup operation. Processing of the flow diagram of FIG. 5 is complete as indicated by process block 509.

In view of the many possible embodiments to which the principles of our disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A logical packet switching device, comprising:
   a first physical device including a plurality of first ingress line cards, a plurality of first ports, a first switching fabric, and a plurality of first egress line cards; and
   a second physical device including a plurality of second ingress line cards, a plurality of second ports, a second switching fabric, and a plurality of second egress line cards;
   wherein the first and second physical devices are each configured to extend a switching fabric of the logical packet switching device between the first and second physical devices over one or more standard-protocol networks coupled to one or more of the plurality of first ports and to one or more of the plurality of second ports; and
   wherein said extending of the switching fabric of the logical packet switching device includes: the first physical device sending packets including second fabric information for use by the second switching fabric in switching corresponding packets to one or more egress line cards of the plurality of second egress line cards, and the second physical device sending packets including first fabric information for use by the first switching fabric in switching corresponding packets to one or more egress line cards of the plurality of first egress line cards;
   wherein the first physical device is configured to perform a first ingress lookup operation for a particular packet on a particular first ingress line card of the plurality of first ingress line cards to determine a particular second egress line card of the plurality of second egress line cards, to forward the particular packet with said second fabric information including an identification of the particular second egress line card through the first switching fabric to a particular first port of the plurality of first ports, and then to send the particular packet with said second fabric information from the particular first port; and
   wherein the second physical device is configured to receive the particular packet with said second fabric information on a particular second port of the plurality of second ports communicatively coupled via said one or more standard-protocol networks to the particular first port, to forward the particular packet through the second switching fabric to the particular second egress line card based on the identification of the particular second egress line card in said second fabric information, and processing the particular packet on the particular second egress line card including performing an egress lookup operation and sending the particular packet from the logical packet switching device from the particular second egress line card.

2. The logical packet switching device of claim 1, wherein a particular egress line card of the plurality of first egress line cards includes: a first particular port of the plurality of first ports, and a second particular port of the plurality of first ports; wherein the logical packet switching device is configured to communicate packets via the first particular port to the second physical device for said extending the switching fabric of the logical packet switching device; wherein the logical packet switching device is configured to communicate packets communicated via the second particular port to one or more devices independent of the logical packet switching device.

3. The logical packet switching device of claim 2, wherein said one or more devices independent of the logical packet switching device include packet switching devices.

4. The logical packet switching device of claim 1, wherein a particular egress line card of the plurality of first egress line cards includes a network processor for processing packets, including packets communicated via a first particular port of the plurality of first ports to the second physical device for said extending the switching fabric of the logical packet switching device, and including packets communicated via a second particular port of the plurality of first ports to one or more devices independent of the logical packet switching device.

5. The logical packet switching device of claim 4, wherein said one or more devices independent of the logical packet switching device include packet switching devices.

6. The logical packet switching device of claim 1, wherein said one or more standard-protocol networks include: an Internet Protocol (IP) network, an IEEE-defined protocol network, or a Multiprotocol Label Switching (MPLS) network.

7. The logical packet switching device of claim 1, wherein said extending the switching fabric of the logical packet switching device between the first and second physical devices is performed over point-to-point communications links.

8. The logical packet switching device of claim 1, wherein the first physical device is a first rack, and the second physical device is a second rack.

9. The logical packet switching device of claim 8, wherein the first and second racks are located in physically different buildings.

10. The logical packet switching device of claim 1, wherein the first and second physical devices are located in physically different buildings.

11. The logical packet switching device of claim 1, wherein each of the plurality of first ports and the plurality of second ports are configurable to perform a first function of extending a switching fabric of the logical packet switching device between the first and the second physical devices and a second function of communicating packets with one or more other devices that are independent of the logical packet switching device; and wherein at least one port of the plurality of first ports and at least one port of the plurality of second ports are each configured to extend the switching fabric of the logical packet switching device between the first and second physical devices; wherein at least one port of the plurality of first ports is configured to communicate packets with one or more other packet switching devices that are independent of the logical packet switching device; and wherein at least one port of the plurality of second ports is configured to communicate packets with one or more other packet switching devices that are independent of the logical packet switching device.

12. The logical packet switching device of claim 1, wherein the egress lookup operation determines a particular egress output port on the particular second egress line card from which the particular packet is said sent from the particular second egress line card.

13. The logical packet switching device of claim 1, wherein said second fabric information includes an identification of a particular egress output port on the particular second egress line card from which the particular packet is said sent from the particular second egress line card.

14. A method, comprising:
performing operations by a logical packet switching device, comprising a first physical device including a plurality of first ingress line cards, a plurality of first ports, a first switching fabric, and a plurality of first egress line cards; and a second physical device including a plurality of second ingress line cards, a plurality of second ports, a second switching fabric, and a plurality of second egress line cards; wherein the first and second physical devices are each configured to extend a switching fabric of the logical packet switching device between the first and second physical devices over one or more standard-protocol networks coupled to one or more of the plurality of first ports and to one or more of the plurality of second ports; wherein said operations include:
performing a first ingress lookup operation for a particular packet on a particular first ingress line card of the plurality of first ingress line cards to determine a particular second egress line card of the plurality of second egress line cards;
forwarding the particular packet with second fabric information including an identification of the particular second egress line card from the particular first ingress line card through the first switching fabric to a particular first port of the plurality of first ports;
sending the particular packet with said second fabric information from the particular first port to a particular second port of the plurality of second ports communicatively coupled via said one or more standard-protocol networks;
forward the particular packet through the second switching fabric to the particular second egress line card based on the identification of the particular second egress line card in said second fabric information; and
processing the particular packet on the particular second egress line card including performing an egress lookup operation and sending the particular packet from the logical packet switching device from the particular second egress line card.

15. The method of claim 14, wherein a particular egress line card of the plurality of first egress line cards includes: a first particular port of the plurality of first ports, and a second particular port of the plurality of first ports; wherein the logical packet switching device is configured to communicate packets via the first particular port to the second physical device for said extending the switching fabric of the logical packet switching device; wherein the logical packet switching device is configured to communicate packets communicated via the second particular port to one or more devices independent of the logical packet switching device.

16. The method of claim 15, wherein said one or more devices independent of the logical packet switching device include packet switching devices.

17. The method of claim 14, wherein a particular egress line card of the plurality of first egress line cards includes a network processor for processing packets, including packets communicated via a first particular port of the plurality of first ports to the second physical device for said extending the switching fabric of the logical packet switching device, and including packets communicated via a second particular port of the plurality of first ports to one or more devices independent of the logical packet switching device.

18. The method of claim 17, wherein said one or more devices independent of the logical packet switching device include packet switching devices.

19. The method of claim 14, wherein said one or more standard-protocol networks include: an Internet Protocol (IP) network, an IEEE-defined protocol network, or a Multiprotocol Label Switching (MPLS) network.

20. The method of claim 14, wherein said extending the switching fabric of the logical packet switching device between the first and second physical devices is performed over point-to-point communications links.

21. The method of claim 14, wherein the first physical device is a first rack, and the second physical device is a second rack.

22. The method of claim 21, wherein the first and second racks are located in physically different buildings.

23. The method of claim 14, wherein the first and second physical devices are located in physically different buildings.

24. The method of claim 14, wherein the egress lookup operation determines a particular egress output port on the particular second egress line card from which the particular packet is said sent from the particular second egress line card.

25. The method of claim 14, wherein said second fabric information includes an identification of a particular egress output port on the particular second egress line card from which the particular packet is said sent from the particular second egress line card.

* * * * *